Patented Mar. 6, 1934

1,950,366

UNITED STATES PATENT OFFICE 1,950,366

PROCESS FOR PREPARING VAT DYESTUFFS OF THE DIBENZANTHRONE SERIES

Otto Stallmann, South Milwaukee, Wis., assignor to E. I. du Pont de Nemours & Company, Wilmington, Del., a corporation of Delaware No Drawing. Application March 10, 1932, Serial No. 598,093

12 Claims. (Cl. 260—61)

This invention relates to vat dyestuffs of the etherified hydroxydibenzanthrone series.

It is an object of this invention to improve the process of preparing ethers of hydroxydibenzanthrone, commonly known as dyestuffs of the "jade-green" series.

Another object of this invention is to prepare certain novel intermediates of the dihydroxy-dibenzanthrone series particularly adapted for the preparation of alkyl ethers therefrom.

Other and further important objects of this invention will appear as the description proceeds.

The process of preparing alkyl ethers of dihydroxy-dibenzanthrones has first been described in U. S. Patent No. 1,531,261 (or British Patent No. 181,304) and a series of related patents. Other patents or publications have from time to time appeared, suggesting different alkylating agents or various improvements upon the process of alkylation. In all these publications the standard procedure seems to be to suspend dihydroxy-dibenzanthrone (obtainable according to U. S. Patent No. 1,093,427) in a dry, inert organic liquid, such as nitrobenzene, adding the alkylating agent and an acid absorbing agent, such as sodium carbonate, and heating the mixture at its boiling point for several hours, or until reaction is completed, as indicated by the changed color of the solution. The mass is then cooled, and the dyestuff which crystallizes out is filtered off and washed.

It has been my experience that when working on a large scale the above reaction is frequently uncontrollable. This is particularly true when alkylating agents heavier and less reactive than methyl-sulfate, for instance ethylene-dibromide or isopropyl-ester of para-toluene sulfonic acid, are used. In such cases, although the reaction will generally proceed to completion, occasionally and apparently without any explainable reason the reaction proceeds only part way and ceases. In fact, frequently, it does not proceed at all to any appreciable extent. And once it has stopped, further heating or increase of the ratio of alkylating agent does not, to my experience, succeed in forcing the reaction any further. The above troublesome behavior is particularly objectionable because it occurs in large scale production, thereby always carrying with it appreciable financial damage, and because it is uncertain and unpredictable, and hence not preventable.

I have now found that if the dihydroxy-dibenzanthrone is first converted into an alkali metal salt, for instance its disodium salt, and isolated dry in this form, and then submitted to alkylation, the latter reaction proceeds very smoothly and regularly even with the heavier and less reactive alkylating agents. Again, when used with dimethyl-sulfate, which gives satisfactory results even according to the old process, the reaction proceeds more smoothly and requires less dimethyl sulfate. In general, I have found the alkali-metal salts of dihydroxy-dibenzanthrone to be considerably more reactive than the hydroxy by itself, and therefore effective for bringing about reaction where the hydroxy body fails.

The alkali metal salts of dihydroxy dibenzanthrone appear to be novel bodies, never before prepared or isolated in substance. I may prepare these novel compounds by several methods of which the following are typical:

1. Dihydroxy-dibenzanthrone is mixed with aqueous sodium carbonate solution and the mixture is evaporated to dryness.

2. Dihydroxy-dibenzanthrone is suspended in a dry, inert organic liquid, for instance solvent naphtha or a petroleum distillate, preferably in the presence of alcohol, and metallic sodium is added in slight excess over theoretical quantity. The liquid medium is then distilled off and the dry residual product is recovered.

3. Dihydroxy-dibenzanthrone is vatted in the usual manner and the dyestuff then precipitated by aeration, filtered, and dried.

Other methods for making the alkali metal salt may be resorted to, for instance, treatment with caustic soda without reduction. In the latter case, however, the product cannot be effectively dried and pulverized, in view of the excess caustic soda which it contains; this method is therefore less desirable for my particular purpose.

Without limiting my invention to any specific procedure, the following examples are given to illustrate my preferred mode of carrying out the same. Parts given are parts by weight.

Example 1

A press cake of dihydroxy-dibenzanthrone containing 100 grams of the dry product (prepared by oxidation of dibenzanthrone and subsequent partial reduction with sodium bisulfite in dilute sulfuric acid according to U. S. Patent No. 1,093,427) is made into a thin paste with about 300 parts of water. 32 parts of dry soda ash are then added and the mixture is stirred at room temperature for about half an hour until a very smooth paste is obtained. This is then dried at about 100° C. and finally pulverized to a fine powder.

The product thus obtained is a greenish-black to bright green powder, depending on the purity of the starting material. When treated with water or sulfuric acid, it hydrolyzes readily to give the free dihydroxy-dibenzanthrone. It is characterized by increased reactivity toward alkylating agents as more particularly illustrated in Example 4 below. It most probably constitutes the disodium salt of dihydroxy-dibenzanthrone in admixture with soda ash.

*Example 2*

A sample of the same starting material as above, equivalent to a press cake containing 100 grams of dry dihydroxy-dibenzanthrone (obtainable as in Example 1) is stirred up with about 8000 parts of warm water. 100 parts of caustic soda (100%) are then added, and after adjusting the temperature to 50–55° C., 80 parts of sodium hydrosulfite are introduced. The vat is then stirred for 1 hour at 50–55° C., then air blown for 10–14 hours, or until all the dyestuff is precipitated out, and then filtered at 80–90° C. The filter cake is washed with a small amount of water (not more than 200 parts) to remove most of the caustic soda, without, however, hydrolyzing the soda salt of the dihydroxy-dibenzanthrone to any appreciable extent. The filter cake is then dried at about 100° C. and pulverized to a fine powder.

The product is substantially identical with that of Example 1, except that it is practically free of soda ash.

*Example 3*

10 parts of dry, finely pulverized dihydroxy-dibenzanthrone are suspended in 100 parts of an organic liquid which does not react with metallic sodium as, for instance, a petroleum distillate of boiling range 170–200° C. 1 part of metallic sodium is added and the mass is heated to 175° C. and kept at this temperature with stirring for about 2 hours. It is then cooled to 60° C. and 10 parts of technically denatured ethyl alcohol are added to consume the excess sodium. The mass is now slowly heated to about 175° C. to distill off the excess alcohol. It is then again cooled to room temperature, filtered, and the filter cake is washed with alcohol until free of petroleum distillate, dried at about 100° C., and pulverized.

The product is substantially the same as in the previous examples.

*Example 4*

10 parts of the soda salt of dihydroxy-dibenzanthrone obtained in Example 1 (or 7 parts of the reaction product of Example 2 or 3, together with 3 parts of soda ash) are suspended in 100 parts of ethylene dibromide ($CH_2Br.CH_2Br$—B.P. about 130°) and 3 parts of fused sodium acetate (pulverized) are added. The mass is heated to reflux temperature (about 130° C.) and stirred at this temperature for about 8–12 hours or until the blue dyestuff formed is free of unchanged initial material. The reaction product is isolated as disclosed in Example 1 of U. S. Patent No. 1,761,624, and is substantially identical with the product therein obtained.

*Example 5*

10 parts of the soda salt of dihydroxy-dibenzanthrone as obtained in Example 1, together with 3.3 parts of fused sodium acetate are suspended in 200 parts of dry dichlorbenzene. The mixture is heated to 150° C. and there are then dropped in uniformly over a period of 2–3 hours, 10 parts of the isopropyl ester of para-toluene-sulfonic acid. The mass is kept at 150–155° C. for about 14 hours, then heated to 175° C. and refluxed at 175–180° C. for about 24 hours, or until a test dyeing is found to be fast to acid. The dyestuff thus obtained may be isolated in a similar manner as mentioned under Example 4 above.

It constitutes most probably the di-isopropyl ether of dihydroxy-dibenzanthrone.

*Example 6*

The process is the same as in Example 12 of U. S. Patent No. 1,531,261, except that in lieu of the free hydroxy-dibenzanthrone body therein specified here the disodium salt of said body, as obtained in Examples 1, 2 or 3 above, is used. The reaction product is the same as in Example 12 of U. S. Patent No. 1,531,261.

*Example 7*

The process is the same as in Example 6 above, except that in lieu of diphenyl-dichlor-methane here an equal weight of benzal-chloride is used. The product is similar to the product obtained from ortho-chlor-benzal-chloride and oxy-dibenzanthrone as disclosed in Example 15 of U. S. Patent No. 1,531,261.

The products of the above examples may be subjected to etherification in the usual manner as applied to the free hydroxy body. The reaction, however, will be found to proceed much more regularly and smoothly than in the case of the free hydroxy body, even where the heavier alkylating agents are used. In the case of the product of Example 1, the addition of soda ash to the alkylation mass may be dispensed with or considerably reduced, in view of its soda ash content. The products of Examples 2 and 3 also require less soda ash, in view of their increased reactivity.

The above improved process is applicable also to mono-alkylated dihydroxy-dibenzanthrone, for instance in the process of preparing unsymmetrical ethers of dihydroxy-dibenzanthrone.

In the claims below it should be understood that where I speak of alkali metal salts of a hydroxy-dibenzanthrone body or of the disodium salt of dihydroxy dibenzanthrone, I am referring in general to the reaction products obtainable by the processes above described, but do not desire to be bound by the correctness or incorrectness of the theory on which said chemical names are based.

I claim:

1. The process of producing an ether of a hydroxydibenzanthrone body which comprises converting said hydroxydibenzanthrone body into an alkali-metal salt thereof, isolating the latter in dry form, pulverizing, and reacting upon the same with an etherifying agent.

2. The process of producing an ether of a hydroxydibenzanthrone body which comprises converting said hydroxydibenzanthrone body into an alkali metal salt thereof, isolating the latter in dry form, pulverizing, and reacting upon the same with an etherifying agent in an anhydrous, inert organic liquid.

3. The process of producing an alkyl ether of a dihydroxy-dibenzanthrone body which comprises converting said dihydroxy-dibenzanthrone body into an alkali metal salt thereof, isolating the latter in dry form, pulverizing and reacting upon the same with an alkylating agent.

4. The process of producing an alkyl ether of a dihydroxy-dibenzanthrone body which comprises converting said dihydroxy-dibenzanthrone body into an alkali metal salt thereof, isolating the latter in dry form, pulverizing, and reacting upon the same with an alkylating agent in an anhydrous, inert organic liquid.

5. The process of producing an alkyl ether of dihydroxy-dibenzanthrone which comprises converting dihydroxy-dibenzanthrone into its disodium salt, isolating the latter in dry form, comminuting the same, and reacting upon the suspension with an alkylating agent in a liquid medium selected from the group consisting of inert organic liquids and excess alkylating agents.

6. In the process of preparing an ether of an hydroxydibenzanthrone body, the step which comprises reacting upon the hydroxydibenzanthrone body with an alkali-metal ion, and recovering the product in dry, solid form.

7. In the process of preparing an alkyl ether of dihydroxy-dibenzanthrone, the step which comprises reacting upon dihydroxy-dibenzanthrone with a reagent selected from the group consisting of metallic alkali metals and alkaline reacting compounds thereof, and recovering the product in dry, solid form.

8. In the process of preparing an alkyl ether of dihydroxy-dibenzanthrone, the step which comprises reacting upon dihydroxy-dibenzanthrone with an alkaline reacting salt of an alkali metal and recovering the product in dry, solid form.

9. In the process of preparing an alkyl ether of dihydroxy-dibenzanthrone, the step which comprises reacting upon dihydroxy-dibenzanthrone with aqueous sodium carbonate, and recovering the solid product in substantially anhydrous form.

10. A compound which is most probably an alkali-metal salt of an hydroxydibenzanthrone body, in substance, said substance being when pure a dry bright green solid mass, readily hydrolyzable in water to give the free hydroxydibenzanthrone body, and further characterized by increased reactivity toward alkylating agents as compared to the parent hydroxydibenzanthrone body.

11. A compound which is most probably an alkali metal salt of dihydroxy-dibenzanthrone, in substance, said substance being when pure a dry bright green solid mass, readily hydrolyzable in water to give free dihydroxy-dibenzanthrone, and further characterized by increased reactivity toward alkylating agents as compared to free dihydroxy-dibenzanthrone.

12. A compound which is most probably the disodium salt of dihydroxy-dibenzanthrone, in substance and substantially anhydrous form, said substance being when pure a dry bright green solid mass, readily hydrolyzable in water to give free dihydroxy-dibenzanthrone, and further characterized by increased reactivity toward alkylating agents as compared to free dihydroxy-dibenzanthrone.

OTTO STALLMANN.